No. 771,871. PATENTED OCT. 11, 1904.
D. GARST.
CULTIVATOR.
APPLICATION FILED OCT. 20, 1903.
NO MODEL. 2 SHEETS—SHEET 1.
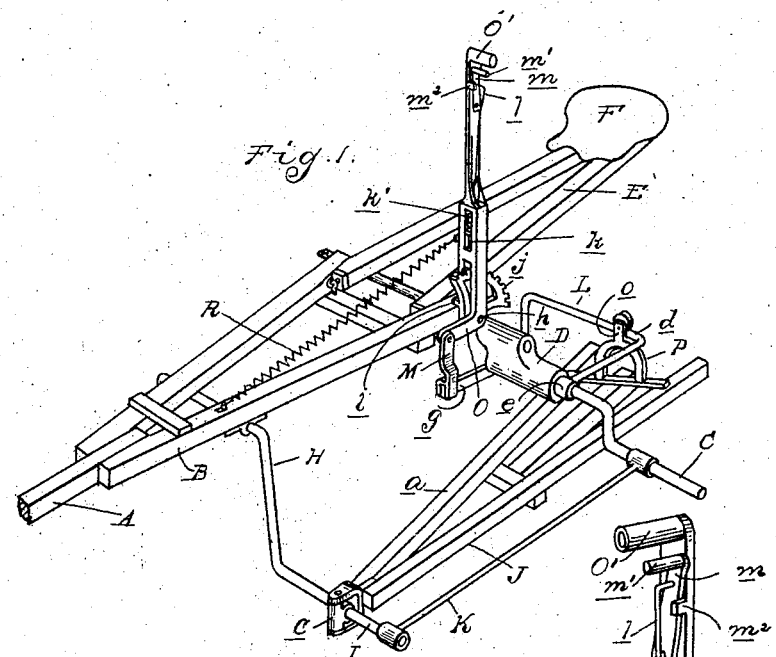
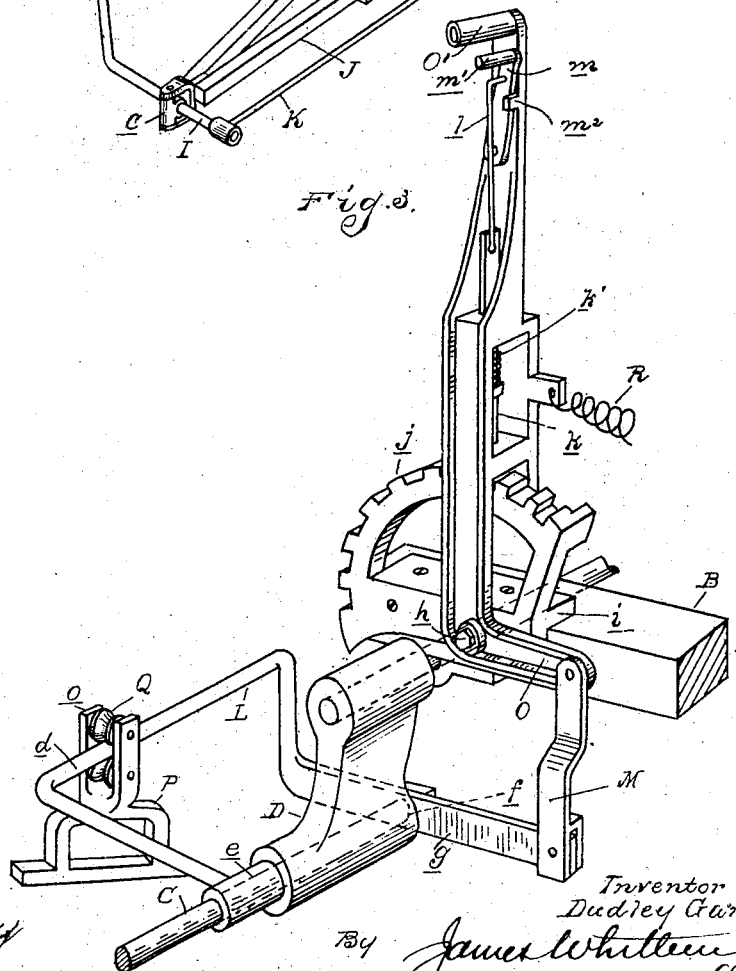
Witnesses
James P. Barry
R. C. Smith
Inventor
Dudley Garst
By James Whittemore
Atty.

No. 771,871. PATENTED OCT. 11, 1904.
D. GARST.
CULTIVATOR.
APPLICATION FILED OCT. 20, 1903.
NO MODEL. 2 SHEETS—SHEET 2.
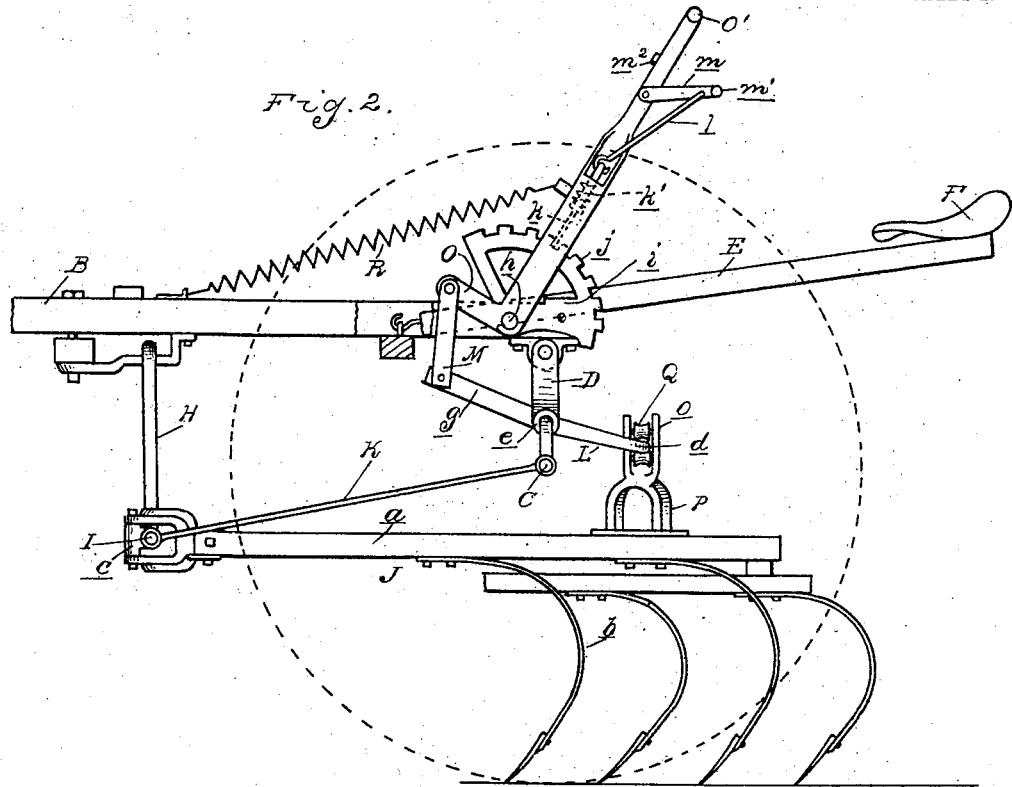
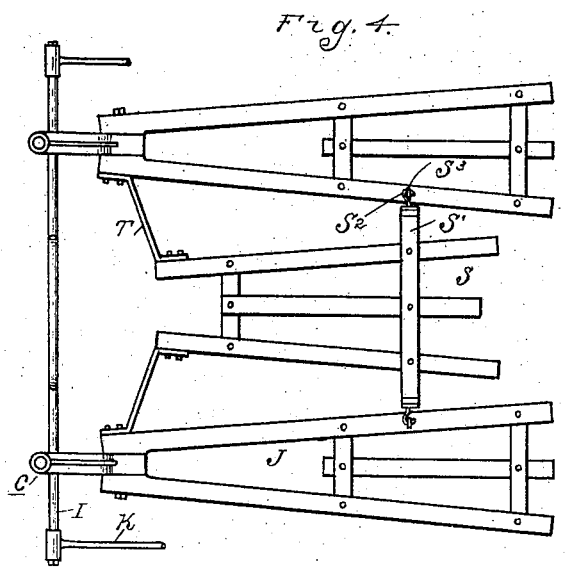
Witnesses
James P. Barry
H. C. Smith
Inventor
Dudley Garst
By James Whittemore
atty.

No. 771,871. Patented October 11, 1904.

UNITED STATES PATENT OFFICE.

DUDLEY GARST, OF DETROIT, MICHIGAN, ASSIGNOR TO THE AMERICAN HARROW COMPANY, OF DETROIT, MICHIGAN, A CORPORATION OF MICHIGAN.

CULTIVATOR.

SPECIFICATION forming part of Letters Patent No. 771,871, dated October 11, 1904.

Application filed October 20, 1903. Serial No. 177,764. (No model.)

*To all whom it may concern:*

Be it known that I, DUDLEY GARST, a citizen of the United States, residing at Detroit, in the county of Wayne and State of Michigan, have invented certain new and useful Improvements in Cultivators, of which the following is a specification, reference being had therein to the accompanying drawings.

The invention relates to improvements in wheeled or sulky cultivators, and has reference to certain features of construction, as hereinafter described and claimed.

In the drawings, Figure 1 is a perspective view of the cultivator to which my improvements are applied. Fig. 2 is a sectional elevation thereof. Fig. 3 is a perspective view of the raising and lowering mechanism. Fig. 4 is a plan view showing the machine adjusted for use as a harrow or weeder.

A is the tongue, which is connected at its rear end to the spreading frame-bars B.

C is the axle, preferably of an upwardly-bowed form and supported in brackets D, secured to the frame-bars B.

E represents bars extending rearward from the frame B and supporting the seat F for the operator.

H is a frame or hanger which is secured to the under side of the frame B and is of an inverted-U-shaped form, being provided at its lower ends with the laterally-extending portions I, which form the draft connections for the cultivator-sections J.

K represents rods connecting the portions I with the axle.

The sections J of the cultivator are of any suitable form, but, as shown, comprising a substantially triangular frame formed by the bars $a$ and the spring-teeth $b$, connected with this frame. The forward end of the frame is provided with a fitting $c$, which embraces the laterally-extending portion I and the hanger H and is pivotally secured thereto.

Pivotally connected to the axle C is a rock-frame L. This, as shown, is formed by a rod or bar bent into a substantially U-shaped form and having the portion $d$ extending parallel to the axle C. One end of this frame has formed thereon an eye $e$, which embraces the axle outside of the bracket B. The opposite side of the frame also pivotally engages the axle at $f$ and has an extension $g$ projecting on the opposite side of the axle—that is, forward therefrom.

M is a link connecting the free end of the extension $g$ to a bell-crank lever O. This lever is pivoted at $h$ to bracket $i$ on the frame, which has connected thereto the notch-segment $j$.

$k$ is a latch-pin carried by the lever O, adapted to engage with notches of the segment and having an operating connection $l$ extending to the finger-lever $m$ at the handle of the lever O.

P is a stirrup secured to the section J and adapted to be engaged by the operator's foot.

Q is a trolley which is connected to an upward extension $o$ of the stirrup P and engages with the laterally-extending portion $d$ of the rock-frame L.

With the construction as thus far described the sections J are drawn forward by the pivotal connection of the fitting $c$ with the members I of the frame. At the same time these sections are free to be moved laterally by reason of the engagement of the trolley Q with the laterally-extending rod $d$ of the frame L, and thus the operator on the seat F by inserting his foot in the stirrup P may move the section in either direction to the limit of travel of the trolley Q.

To raise or lower the sections, so as to alter the depth that the cultivator-teeth are inserted in the ground, the bell-crank lever O may be adjusted by first disengaging the latch $k$ through the operation of the finger-lever $m$. In this operation the lever O will actuate the link M, which in turn will rock the frame L and change the elevation of the bar $d$, which supports the trolley Q.

To facilitate the raising of the section, a spring R is arranged to counterbalance the weight of the section. This spring, as shown, is arranged above the frame B, one end being connected to said frame and the opposite end to the lever O above the segment $j$. By reason of this arrangement whenever the lever O is moved by the operator in a direction to lower the section the spring R is placed under tension, so that the return movement of raising the section is assisted by the spring. This greatly lessens the work of raising the section, and it is accomplished without interfering with the perfect freedom of movement of the section under the guidance of the operator's foot.

To facilitate the adjustment of the lever O, the finger-lever $m$ is preferably arranged so that it may be locked in a position where the bolt $k$ is disengaged from the segments. As shown, this is accomplished by pivoting the lever $m$ to the lever O and providing the latter with a laterally-extending handle O' and the lever $m$ with the laterally-extending handle $m'$. The lever O is also provided with a stop $m^2$, against which the lever $m$ may be turned, as shown in Fig. 3. In this position the lever $m$ is turned, so as to carry its point of adjustment with the link $l$ beyond the pivotal point of attachment to the lever O, and thus the link and the bolt $k$ are locked. To release the bolt, it is only necessary to press the handle $m'$ so as to carry the lever $m$ on the opposite side of its center, whereupon the spring $k'$ will reëngage the bolt $k$ with the segment.

In order to adjust the machine for use as a harrow or weeder, I preferably provide an attachment comprising the section S, provided with harrow-teeth and adapted to be attached by brackets T to the forward ends of the sections J. The narrow end of this section S is also provided with a cross-bar S', having hooks $S^2$ at its opposite ends for detachably engaging with eyes $S^3$ on the sections J. When these sections are arranged as shown in Fig. 4, the machine may be used as a harrow, and by locking the lever $m$ in the manner before described the sections will be free to rise or lower automatically.

What I claim as my invention is—

1. The combination with a wheeled frame of a cultivator-section having at its forward end a pivotal draft connection with said frame, a rock-frame pivoted to said wheeled frame in rear of said draft connection, a trolley-hanger resting upon and secured to the upper surface of said pivoted section, and having a traveling engagement with said rock-frame, laterally of said wheeled frame, and means for locking said rock-frame in different positions of adjustment.

2. The combination with a wheeled frame of a cultivator-section, having at its forward end a pivotal draft connection with said frame, a rock-frame pivoted to the axle of said wheeled frame, and having its rear portion extending substantially parallel to said axle, a trolley-hanger secured to said section, and having a traveling engagement with said parallel portion of said rock-frame, a lever for rocking said rock-frame, and means for locking said lever in different positions of adjustment.

3. The combination with a wheeled frame of a cultivator-section having at its forward end, a pivotal draft connection with said frame, a rock-frame pivoted to the axle of said frame, and having at its rear end a laterally-extending portion substantially parallel with the axle, a trolley-hanger secured to said section, and having a traveling engagement with the laterally-extending portion of said rock-frame, a lever for rocking said frame, and means for partially counterbalancing the weight of said section upon said rock-frame, to facilitate the adjustment of said lever.

4. The combination with a wheeled frame of a cultivator-section having at its forward end a pivotal draft connection with said frame, a rock-frame pivoted to the axle of said frame and extending rearward therefrom having at its free end a laterally-extending portion, a trolley-hanger secured to said section, and having a traveling engagement with said laterally-extending portion, a lever for rocking said frame fulcrumed upon said wheeled frame, and extending upward therefrom, and a spring connected to said lever, and to said wheeled frame at its opposite ends, and forming a means for partially counterbalancing the weight of said section upon said rock-frame.

5. The combination with a frame, depending brackets thereon, an axle secured in said brackets, a substantially U-shaped rock-frame having its arms pivotally secured to said axle upon opposite sides of said bracket, and the connecting portion thereof, extending substantially parallel to said axle, an extension of one of said arms forward of said axle, a cultivator-section having at its forward end a pivotal draft connection with the first-mentioned frame, a trolley-hanger secured to said section, and having a traveling engagement with the laterally-extending portion of said U-shaped frame, a bell-crank lever having one arm thereof connected to said forwardly-extending arm of said U-shaped frame, said lever being fulcrumed to the first-mentioned frame, a spring connected to said lever, and to the frame upon which it is fulcrumed, and means for locking said lever in different positions of adjustment.

6. The combination with a frame comprising the tongue A and the spreading frame-bars B secured thereto, of brackets secured to, and depending from the bars B, an axle secured in the lower ends of said brackets, a substantially U-shaped frame pivoted upon said axle upon opposite sides of said brackets, the connecting portion of said U-shaped frame, extending substantially parallel with said axle, and in rear thereof, and one of the arms of said U extending forward of the axle, a cultivator-section having a pivotal draft connection at its forward end to said frame, a trolley-hanger secured to said section, and having a traveling engagement with said laterally-extending portion of said U-shaped frame, a bell-crank lever O fulcrumed to one of the frame-bars B, a link connecting one end of said bell-crank with the forwardly-projecting portion of said U-shaped frame, a spring R connected to said lever at one end and to the one of the frame-bars B at its opposite end, and means for locking said lever in different positions of adjustment.

7. The combination with a cultivator provided with two separated toothed sections having pivotal draft connections at their forward ends, of a supplemental section extending longitudinally between said pivotal sections and brackets at the forward end of said supplemental section for detachably connecting it to the forward ends of said pivotal sections, and a cross-bar at the rear end of said supplemental sections having a detachable hook engagement with the pivotal sections forming a cross connection between said pivotal sections.

In testimony whereof I affix my signature in presence of two witnesses.

DUDLEY GARST.

Witnesses:
W. H. DODD,
J. W. HOOPER.